(12) United States Patent
Hanus

(10) Patent No.: US 6,642,472 B1
(45) Date of Patent: Nov. 4, 2003

(54) PLASMA THERMAL PROCESSING SYSTEM HAVING CARBON SENSING AND CONTROL

(75) Inventor: Gary J. Hanus, Edina, MN (US)

(73) Assignee: Phoenix Solutions Co., Minneapolis, MN (US)

( * ) Notice: Subject to any disclaimer, the term of this patent is extended or adjusted under 35 U.S.C. 154(b) by 0 days.

(21) Appl. No.: 10/138,758

(22) Filed: May 3, 2002

(51) Int. Cl.[7] .............................. B23K 9/02; H05H 1/00

(52) U.S. Cl. ..................................... 219/121.36; 373/18

(58) Field of Search ................. 373/18–20; 219/121.36, 219/121.48, 121.52, 121.11; 110/203, 212, 215, 246, 345; 266/147; 432/106, 210, 258; 422/179, 180; 95/58, 81; 423/258, 259, 489, 490

(56) References Cited

U.S. PATENT DOCUMENTS

| 4,644,877 | A |   | 2/1987  | Barton et al. |
| 5,207,999 | A | * | 5/1993  | Burk et al. ................. 423/258 |
| 5,280,757 | A |   | 1/1994  | Carter et al. |
| 5,319,176 | A |   | 6/1994  | Alvi et al. |
| 5,376,341 | A | * | 12/1994 | Gulati ........................ 422/179 |
| 5,534,659 | A |   | 7/1996  | Springer et al. |
| 5,548,611 | A | * | 8/1996  | Cusick et al. ................. 373/18 |
| 6,224,653 | B1| * | 5/2001  | Shvedchikov et al. ......... 95/58 |
| 6,517,791 | B1| * | 2/2003  | Jaynes ........................ 423/210 |

* cited by examiner

Primary Examiner—Tu Ba Hoang
(74) Attorney, Agent, or Firm—Paul Sjoquist

(57) ABSTRACT

A discharge housing for connection to a plasma arc furnace outlet, having water quenching stations positioned inside the housing into the gas flow path, and having an inner flow path concentrically positioned inside an outer flow path, with an exhaust port on the downstream end of the outer flow path.

9 Claims, 3 Drawing Sheets

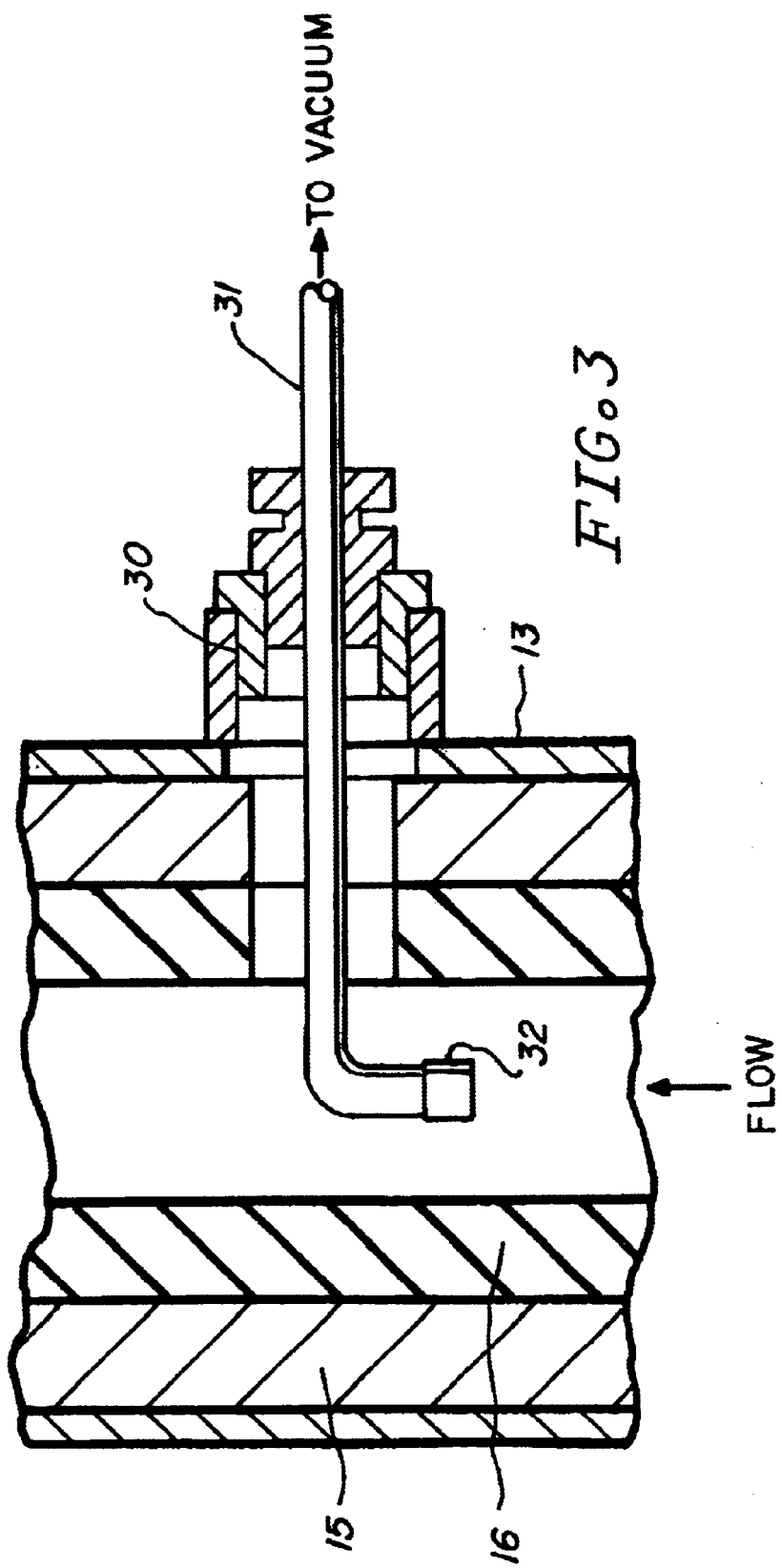

PLASMA THERMAL PROCESSING SYSTEM HAVING CARBON SENSING AND CONTROL

BACKGROUND OF THE INVENTION

The present invention relates to an apparatus for the disposal of hazardous wastes, by decomposition of the materials using an extremely high temperature plasma arc furnace, and subsequent treatment of the decomposed residue to control the carbon byproducts.

A prior art patent which describes one form of an apparatus and process for disposing of waste material in this manner is U.S. Pat. No. 4,644,877, issued Feb. 24, 1987, which describes a system for feeding waste materials into a plasma arc burner furnace where the materials are atomized and ionized, and then discharging the residue into a reaction chamber to be cooled and recombined into a product gas and particulate matter which is non-toxic. The recombined products are quenched with an alkaline atomized spray to neutralize the products and to wet the particulate matter. The product gas is extracted from the recombined products, and the extracted product gas is burned. The patent describes a form of construction of the apparatus which is "compact" in size, permitting the device to made sufficiently small so as to be mobile and transportable to a hazardous waste site in a 45-foot truck or trailer. The patent does not describe an apparatus or process for addressing the problem of carbon formation during the process, nor does it disclose any method or apparatus for sensing or controlling carbon formation.

Another form of hazardous waste processing system is described in U.S. Pat. No. 5,319,176, issued Jun. 7, 1994. In this patent, a product of the process is carbon black, which is created and controlled by steam injection into the waste material stream during the burning process. The patent describes a dual plasma arc system, wherein one furnace is used for pyrolysis and a second chamber is used for secondary off-gas processing which produces a carbon black byproduct.

Another prior art patent which discloses a typical construction for a plasma arc furnace of the type of interest herein is U.S. Pat. No. 5,534,659, issued Jul. 9, 1996, to Springer et al.

In view of the foregoing patents, and other prior art in the field, it would provide a distinct advantage to have a hazardous material plasma arc furnace with as small a physical form as possible, and to provide such a processing system with sensors and control mechanisms for controlling the amount of carbon byproduct created by the processing system.

SUMMARY OF THE INVENTION

An apparatus and method for destroying hazardous waste products in a plasma electric arc furnace of small physical size, using water quenching to cool the process gases and a carbon sensor in the process flow path to monitor carbon buildup, and a control mechanism to control carbon loading of the process materials. The furnace has a discharge and quench assembly which directs the furnace exhaust in a wrap-around path, and utilizes three water injection sprayers at various positions along the path for cooling, and utilizes a carbon sensor in the flow path which monitors flow path pressure to detect carbon buildup, and controls materials in the flow path as needed to maintain a low amount of carbon buildup.

It is a principal object of the invention to provide a compact hazardous material disposal system which does not release hazardous materials into the atmosphere.

It is a further object of the invention to provide a waste disposal system wherein the amount of carbon buildup can be controlled.

It is another object of the invention to provide a plasma arc furnace for destroying hazardous materials where the destruction residue can be quickly and efficiently cooled after thermal processing.

Other and further objects and advantages of the invention will become apparent from the following specification and claims and with reference to the appended drawings.

BRIEF DESCRIPTION OF THE DRAWINGS

FIG. 3 shows an enlarged partial cross-section showing the carbon sensor.

DESCRIPTION OF THE PREFERRED EMBODIMENT

Figure 1:
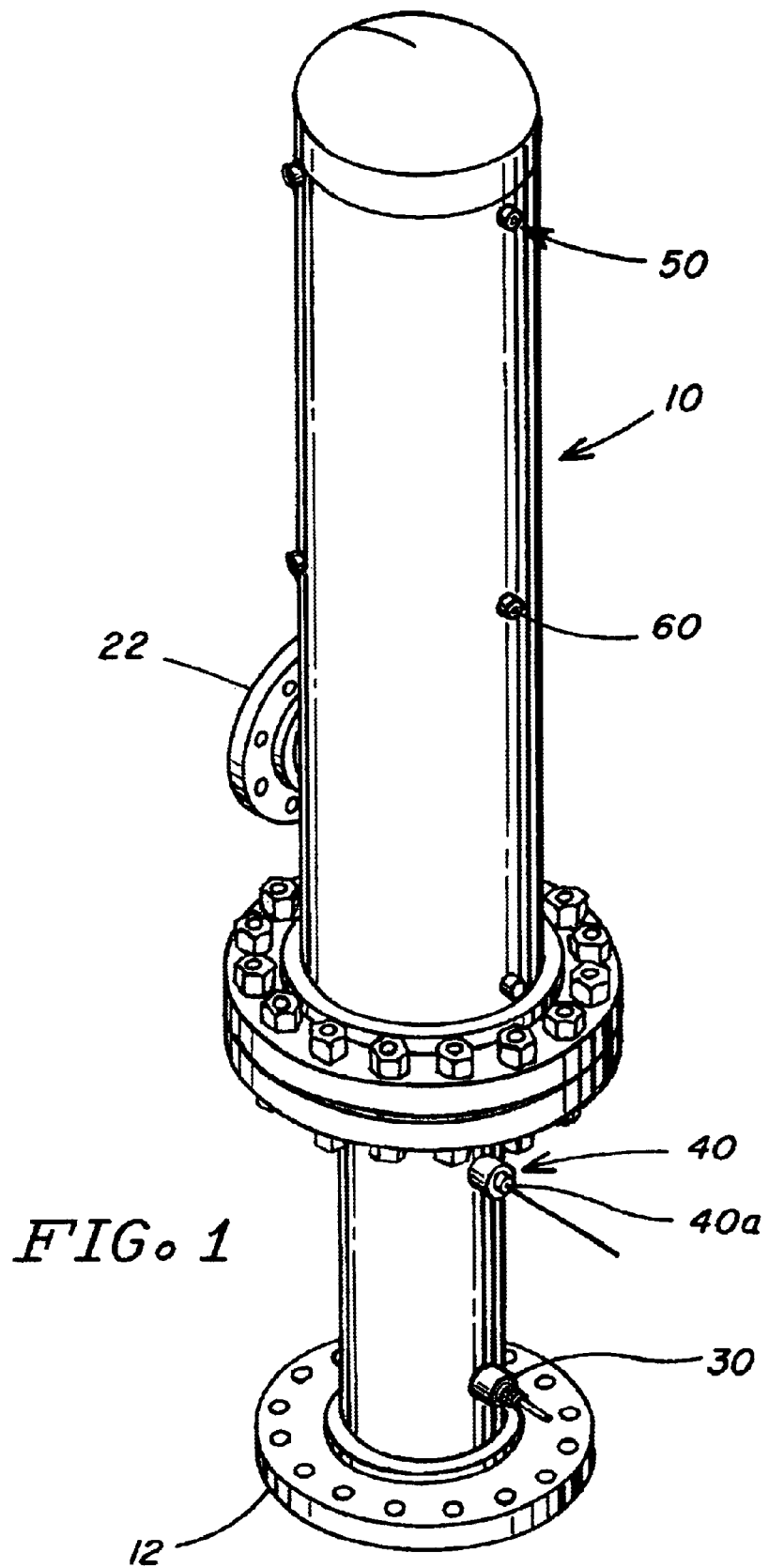
FIG. 1 shows and isometric view of the housing assembly for removal of hot gases and other materials from the plasma arc furnace.
Figure 2:
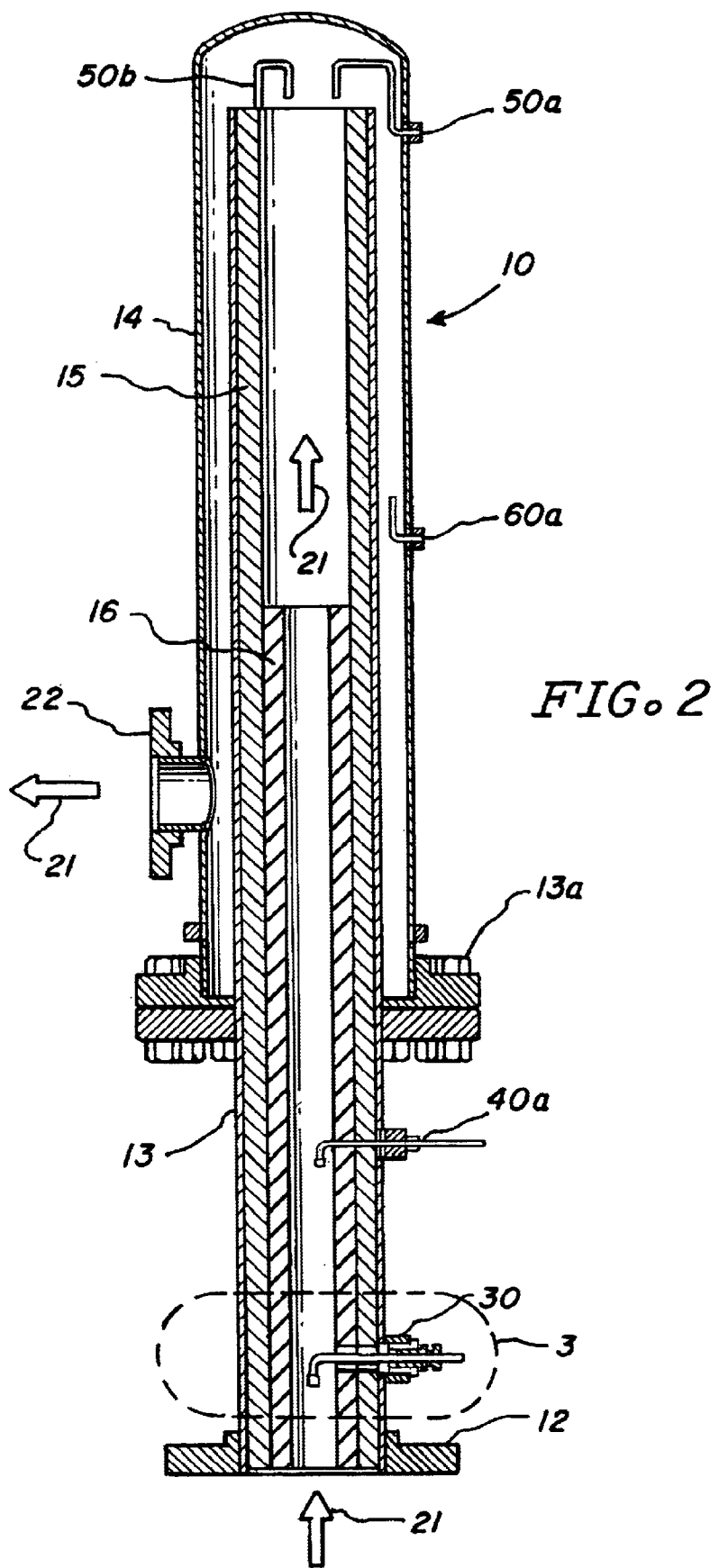
FIG. 2 shows a side view in cross-section of the apparatus of FIG. 1.

Referring to the drawing figures, like reference characters refer to the same or functionally similar parts of the respective components illustrated in each of the figures.

FIG. 1 shows an isometric view of the housing assembly 10 for removal of hot gases and particulates from a plasma arc furnace. A mounting flange 12 is secured to the outside wall of a furnace combustion chamber, which may be similar to the types described in the prior art patents identified herein. The temperature of the materials which flow into housing 10 through flange 12 is typically 800° C.–2000° C. As described in the Springer et al patent, it is desirable to rapidly quench the temperature of the gases and particulates to a temperature in the range of 350° C. to about 800° C., to reduce the likelihood of reformation of organic compounds in the exhaust gases. The present invention accomplishes this quenching in a very small housing, as will be described herein. The exhaust gases leave housing 10 via an exit flange 22, at the temperature range described herein.

A pressure transducer 30 is positioned near the entrance point in housing 10, to monitor the gas flow path and sense the carbon accumulation in the gas flow. A first quenching station 40 is positioned downstream of the transducer 30, a second quenching station 50 is positioned downstream of the first station 40, and a final quenching station 60 is positioned proximate the exhaust flange 22, downstream of station 50. Each of these quenching stations is controllable to spray water into the flow path to assist in reducing the temperature of the gases, to incrementally reduce gas flow temperature. The parts of the housing 10 are formed in sections which are bolted together with a flange 13a for ease of disassembly and repair.

Housing 10 has an inner rigid tube 13 affixed at its lower end to flange 12. Lining the inside of tube 13 is a refractory insulating tube 15, and inside the lower portion of insulating tube 15 is positioned a further refractory insulating tube 16. Together, the tubes 15 and 16 serve to insulate the outer tube 13 from the extreme temperatures of the gases flowing through the apparatus. As the gas flows in the direction of the arrows 21 past the first quenching station 40 it is partially cooled by a spray from sprayers 40a, etc. which are positioned around the circumference of the tube 13.

When the gas flow leaves the vicinity of the upper end of tube 16, it has cooled somewhat, therefore slightly less insulating effect is provided by the remaining length of tube 15. As the gas flows out the top of tube 15 it passes quenching station 50, and sprayers 50a, 50b, etc. spray cooling liquid into the gas flow path, thereby cooling the gas still further.

At the top of tube 13, the gas flow path reverses and continues downward inside tube 14, along the outside of tube 13. The gas flow path passes quenching station 60 and is further cooled by spray from sprayers 60a, etc. Finally, the gas exhausts out through exhaust flange 22 at a significantly reduced temperature.

FIG. 3 shows an expanded view, in partial cross-section, to illustrate the sensor 30. The sensor 30 is comprised of a vacuum tube 31 having an inner bend facing toward the gas flow path within housing 10. At the inner end of tube 31 is mounted a porous, monolithic, ceramic head 32, made from a material selected to be appropriate for micron to submicron particulate capture characteristic of carbon formation from the gas flow. The differential pressure across the ceramic material is monitored, and provides an indication of the amount of carbon accumulation that occurs on the ceramic head 32, and therefore an indication of the amount of carbon in the gas flow. Based on the monitored differential pressure, remedial action can be taken within the furnace to reduce the carbon particulate loading, including action to add steam or oxygen into the furnace to change the heating and destruction characteristics.

In operation, the individual quenching stations are controllable to regulate temperature at various points along the flow path, to control the output gas temperature to a desired level. Additionally, the differential pressure across ceramic head 32 is measured to permit control of the amount of oxygen or other material should be added to the destruction process, to thereby control the quantity of carbon particulate existing in the furnace exit flow.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for controlling the exhaust gases from a plasma arc furnace, comprising a housing attachable to the outlet from said furnace, said housing having an initial insulated portion with at least one spray quenching station for delivering cooling spray into the exhaust gases, and having an open downstream end, said housing having an outer passageway concentrically fitted over said inner passageway, having an upstream end in gas flow communication with the downstream end of said inner passageway, with an end cap for deflecting the exhaust gases into a reverse direction, and having a downstream end, said outer passageway having at least one spray quenching station for delivering cooling spray into the exhaust gases, and an exhaust fitting proximate the downstream end of said outer passageway.

2. The apparatus of claim 1, further comprising a pressure sensor positioned in a flow path of said exhaust gases, said pressure sensor having a porous ceramic head for capturing carbon particulate in the exhaust gases.

3. The apparatus of claim 2, wherein said pressure sensor further comprises a vacuum tube projecting through said housing into said gas flow path, said tube having a right angle bend with a distal end, and said ceramic head positioned at the distal end of said right angle bend.

4. The apparatus of claim 1, wherein said inner passage further comprises a tubular sleeve having a first inner refractory insulated material liner, and a second refractory insulated material liner in said first inner refractory liner.

5. A plasma arc furnace cooling and discharge housing, comprising:

a) an elongated tube having a flange adapted for connection to a plasma arc furnace discharge port, and having an open downstream end;

b) an insulating inner liner concentrically fitted into said elongated tube;

c) an outer housing cover concentrically fitted over said elongated tube, and sized to provide a flow path therebetween and to deflect the flow path into a reverse direction relative to the flow path inside the elongated tube; and d) an exhaust port in said outer housing cover.

6. The apparatus of claim 5, further comprising a plurality of spray quenching stations positioned along the flow path, each station comprising spray heads directed toward the flow path and selectively controllable to spray cooling liquid into the flow path.

7. The apparatus of claim 6, further comprising a pressure transducer positioned in said elongated tube.

8. The apparatus of claim 7, wherein said plurality of quenching stations further comprises three quenching stations.

9. The apparatus of claim 8 wherein said three quenching stations further comprise a first station proximate the input end of said elongated tube, and a second quenching station proximate the downstream end of said elongated tube, and a third station in said outer housing cover.

* * * * *